Jan. 14, 1930.                L. AVORIO                    1,743,951
                               PARACHUTE
                         Filed Dec. 11, 1928          2 Sheets-Sheet 2

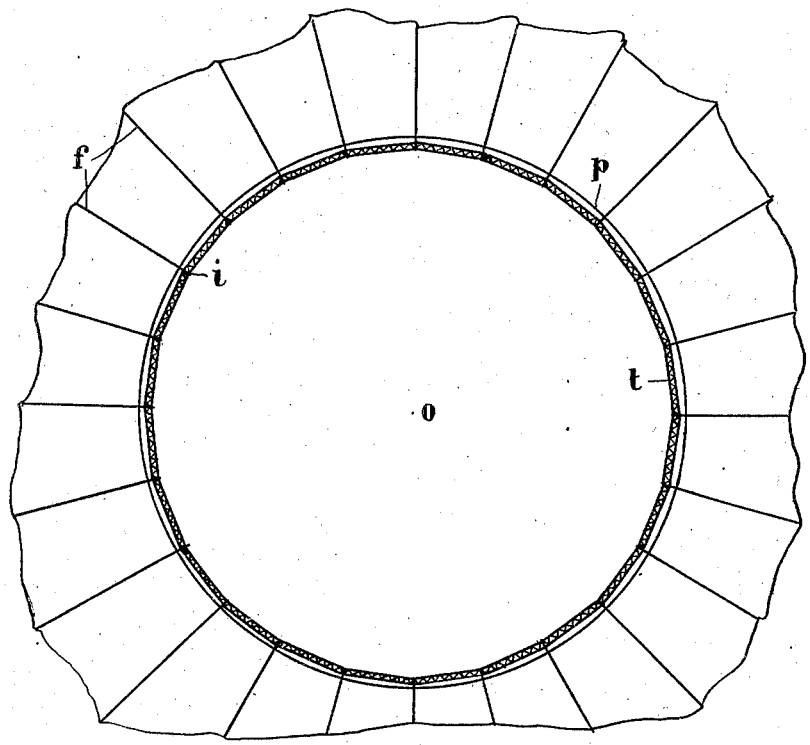
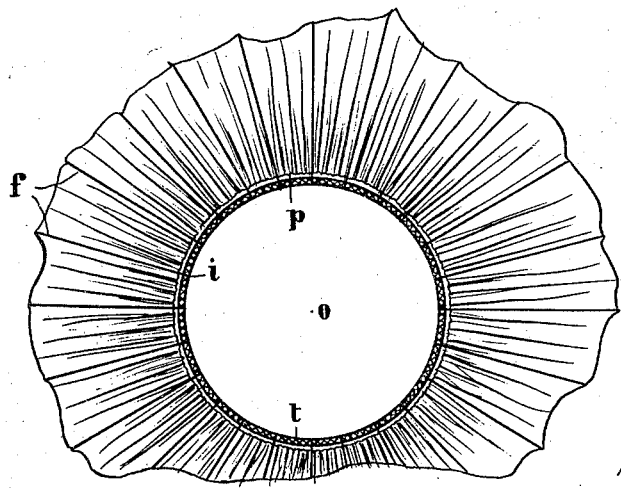

INVENTOR
Luigi Avorio
BY
ATTORNEYS.

Patented Jan. 14, 1930

1,743,951

UNITED STATES PATENT OFFICE

LUIGI AVORIO, OF ROME, ITALY

PARACHUTE

Application filed December 11, 1928, Serial No. 325,252, and in Italy December 23, 1927.

This invention relates to improvements in parachutes and more particularly to the construction of the dilatable vent or aperture provided at the apex of the cap of parachutes.

It is recognized that the vent or aperture, at the moment when the air first enters the parachute, must remain as small as possible, in order to avoid the escape of air, with the consequent danger of the parachute failing to open out. When the air has entered, the cap unfolds and assumes its proper shape and the fabric forming the cap becomes distended whilst at the same moment the vent must dilate to its fullest extent.

The closing and opening of the vent is effected by means of cords, tubes or elastic ribbons encircling the vent and fastened to the fabric of the cap. In order however to ensure this connection it is necessary to employ protective sheaths, reinforcements, seams and the like in the vicinity of the vent, the edges of which are thus stiffened and hindered from shrinking to the full normal extent; moreover the vent is prevented from easily and completely distending owing to the friction produced between the elastic contraining elements and their sheaths. This renders it impossible to utilize fully the important advantages inherent to an elastically constrained vent, while moreover giving rise to further drawbacks such as the greater encumbrance of the sheaths, reinforcements and the like, the diminished elasticity of the fabric in the vicinity of these sheaths and reinforcements, and the increase of lines of less resistance constituted by the seams where the tension of the cap is at its maximum.

The present invention aims at eliminating all the above-mentioned drawbacks, whilst at the same time furnishing certain advantages which will hereinafter become apparent.

The invention is based on the observation that in most types of parachutes the suspension ropes extend along the meridians of the cap, starting from the vent and reaching the edge of the cap so that under the action of the human body during the fall, the said ropes are tensioned up to the vent even before the parachute opens.

The present invention takes advantage of this circumstance, and according to the invention there is employed as elastic element to produce the variation of the diameter of the vent, an elastic ring which normally has a diameter corresponding to that of the minimum opening of the aperture, and to which ring are fastened the ends of the suspension ropes running along the meridians, the attachments of the said ropes and the whole ring being free and not inserted in the fabric. In this manner the ropes when tensioned expand the ring which assumes the shape of a funicular polygon, stretching out until it reaches such dimensions that its internal elastic tensions are in equilibrium with the deforming tensions of the ropes, such stretching not being hindered by any contact with and friction between the fabric.

In order more clearly to understand the invention, reference is made to the accompanying drawings which illustrate digrammatically and by way of example one embodiment thereof and in which:—

Figs. 1 and 2 illustrate the vent in the state of maximum extension and of maximum constriction respectively.

Figure 3:
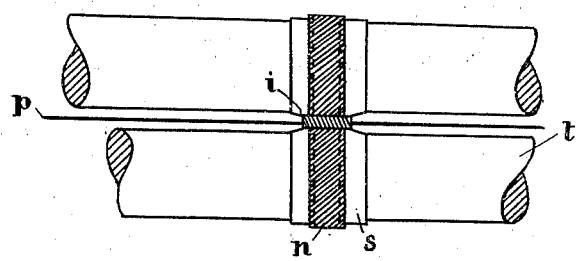
Figs. 3, 4 and 5 illustrate a method of attaching the suspension ropes to the elastic ring, said figures showing respectively a front elevation, a cross section and a top view.
Figure 4:
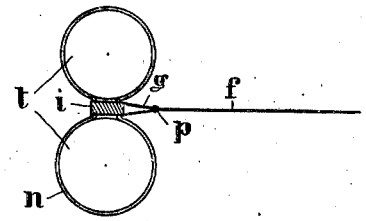
Figure 5:
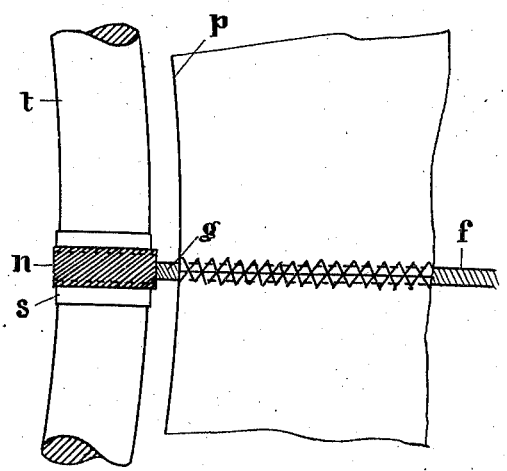

In the embodiment shown —f— indicates the suspension ropes provided at their upper end with extensions —g— projecting from the periphery —p— of the vent —o— along the edge of which runs an elastic ring —t— consisting, for example of two rubber tubes or cords. At the free ends —g— of the ropes, the elastic rings are held together by a small band —n— having the shape of an 8, sewed on a leather strip —s—. At the crossing point —i— of the 8 formed by the band —n—, embracing the two tubes, is fastened the corresponding end —g—, of the suspension rope, thus forming a buckle. By this means as many attachments to the elastic ring are obtained as there are the suspension ropes, and the number of these attachments is as a rule always sufficient to maintain the ring well fastened to the cap.

At the moment when the parachute opens out completely, the suspension ropes, which are already stretched by the weight of the human body, transmit their tension to the crossing points —i—, thus causing the complete distension of the elastic ring (Fig. 1) even before the fabric of the cap is tensioned, both because the tension of the cap is, as already stated, diminished by the lesser radius of curvature of the gores of the cap; and because the tensioning of the fabric takes place later than that of the ropes, owing to the greater elasticity of the fabric, especially when made of silk and applied diagonally.

In conclusion, by fastening the tubes, cords or bands constituting the elastic ring, exclusively to the suspension ropes, instead of to the cap itself, it is possible to eliminate the aforementioned sheaths, reinforcements and seams which stiffen and weaken the system. The fabric at the periphery —p— of the vent is not thickened and can thus shrink to furnish the minimum size of vent and can then rapidly expand to its full extent before the cap is fully distended, since friction with the fabric of the covering sheath is avoided.

Moreover the above described drawbacks are diminished and the advantage of a great simplicity of construction is secured, because simple ties are sufficient to fasten the elastic ring, which thus affords a greater facility in changing the ring, since the operations are reduced to simple tying and untying.

As will be seen in Fig. 1, the tubes, cords and elastic bands assume, at the moment of the complete opening, a polygonal shape, which does not however prevent the vent from assuming the circular constructive form. Finally, the wrapping of band —n— around the tube prevents the latter from dropping out in case of breakage and thus causing the aperture to widen out completely.

The number of elastic elements may vary within the widest limits and they may be placed either inside or outside the vent or on the periphery itself, the essential condition being only that they be not attached to the fabric, but that the stresses are imparted thereto by means of the ropes running along the meridians.

Claims:

1. A parachute with an elastically deformable cap and a vent, in which the elasticity of the vent is furnished by a free elastic ring, to which are attached the upper ends the suspension ropes running along the meridians of the cap.

2. An elastic ring for the vent of parachutes having a deformable cap, as set forth in claim 1, formed of a plurality of elastic tubes or cords and characterized in that the several elastic elements are connected among themselves in the points corresponding with the ends of the suspension ropes.

In testimony whereof I have affixed my signature this 23rd day of November 1928.

LUIGI AVORIO.